United States Patent [19]
Speed

[11] 3,762,732
[45] Oct. 2, 1973

[54] CLAMPING DEVICE OR CHUCK

[75] Inventor: Russell H. Speed, Reno, Nev.

[73] Assignee: Standard Pneumatic Motor Company, Reno, Nev.

[22] Filed: Feb. 25, 1972

[21] Appl. No.: 229,524

[52] U.S. Cl................... 279/102, 279/1 Q, 279/82
[51] Int. Cl............................................ B23b 31/10
[58] Field of Search...................... 279/1 Q, 22, 82, 279/102, 76, 1 SG

[56] References Cited
UNITED STATES PATENTS

| | | | |
|---|---|---|---|
| 2,807,473 | 9/1957 | Kiehne | 279/82 |
| 2,638,761 | 5/1953 | Henry | 279/1 Q |
| 2,468,946 | 5/1949 | Sherman | 279/1 Q |

*Primary Examiner*—Gil Weidenfeld
*Attorney*—J. Carroll Baisch

[57] ABSTRACT

A clamping device for easily and quickly releasing or firmly securing a rotary cutting or grinding tool such as a burr, bit, or the like to a rotatable drive shaft having a longitudinally-extending, tool-shaft-receiving bore at its outer free end for reception of the shaft of rotary cutting tools such as burrs, bits, and the like. A cylindrically-shaped insert of resilient material (e.g. rubber) is disposed axially relative to the drive shaft and in a counter-bore at the free end of said drive shaft, said insert having an axial bore therethrough of approximately the same diameter as the outside diameter of the shaft of the cutting tool, so that the cutting tool shaft can be slipped into and out of the insert bore and the bore of the drive shaft.

A plurality of steel balls are disposed in radial bores in the wall of the counter bore of the drive shaft, and there is cam means slideable on the drive shaft for forcing the balls into the insert to thereby compress parts of the insert onto the shaft of the cutting tool and to thereby effect operable clamping of the cutting tool shaft in the clamping device. Sliding the cam means in one direction effects clamping of the cutting or grinding tool shaft in the device, and sliding such cam means in the opposite direction effects release of said cutting or grinding tool shaft so that said cutting tool may be readily removed from the clamp device.

As used herein, the term rotary cutting tool or tools includes various cutting tools such as, for example, bits, burrs, rotary grinding tools and the like.

12 Claims, 4 Drawing Figures

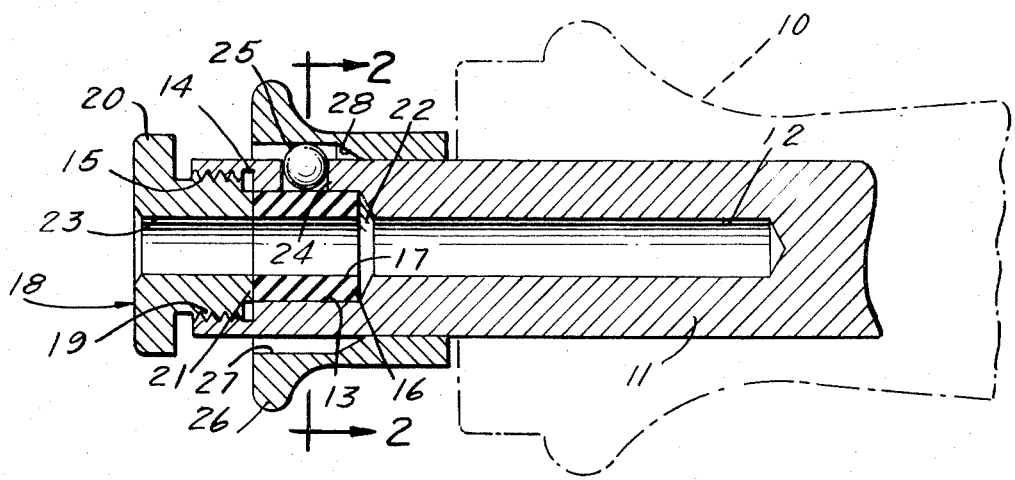
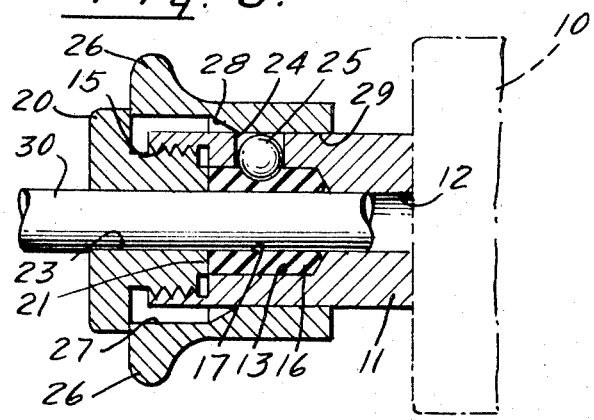
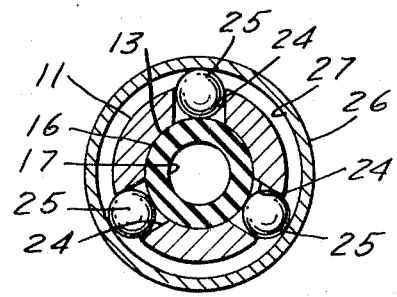
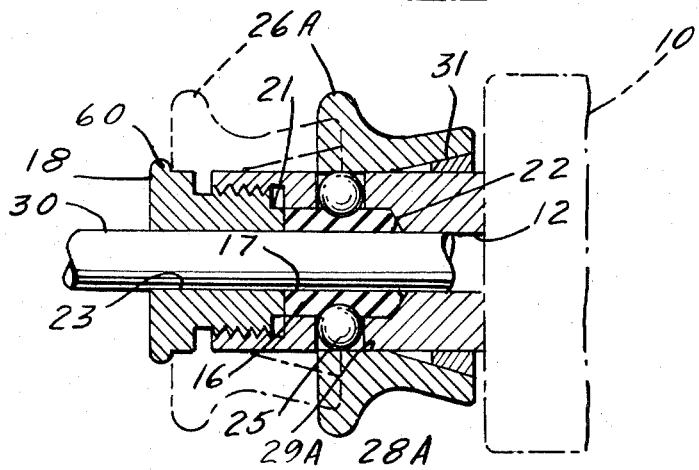

CLAMPING DEVICE OR CHUCK

BACKGROUND OF THE INVENTION

1. Field of the Invention

This invention relates generally to clamping devices and relates more particularly to a device for clamping rotatable cutting tools and the like to rotary drive shafts.

2. Description of the Prior Art

There are various types of clamping devices such as chucks having metal jaws and some having metal balls adapted to be forced against the metal shafts of cutting devices. However, in all of these devices, as far as I am aware, the jaws or balls have metal-against-metal contact and require very close tolerances, or require notches in the cutting tool's shaft or special configurations other than a plain round shaft.

SUMMARY OF THE INVENTION

The present invention comprises a clamping device for clamping the plain, round shafts of rotary cutting tools and the like to rotary drive shafts adapted to be operably connected to a source of power. The drive shaft has a longitudinally-extending bore at its outer end for reception of the shaft of the cutting tool. There is a resilient insert disposed axially relative to the drive shaft in an axial counter-bore at the free end of the drive shaft, the insert having an axial bore or passage therethrough of approximately the same diameter as the outside diameter of the shaft of the cutting tool, so that the cutting tool shaft can be slipped easily and quickly into and out of the insert bore and the bore of the drive shaft when the clamping device is in the release position.

There are a plurality of radial bores in the wall of the counter-bore of the drive shaft, and there is cam means slideable on the drive shaft for forcing the balls into the insert to thereby compress portions of same onto the shaft of the cutting tool and effect operable clamping of the cutting tool shaft in the clamping device and, hence, to the drive shaft. Sliding the cam means in one direction effects clamping of the cutting tool or grinding tool shaft in the device and sliding such cam means in the opposite direction effects release of the cutting or grinding tool shaft.

There is a threaded-nut arrangement engageable in the end of the rotatable driving shaft which may be adjusted so as to control the length of the counter-bore in which the resilient insert rests. This adjustable feature serves a dual purpose: (1) It enables compensation for tolerance variation on the length of the insert, and (2) it permits the counterbored chamber's volume to be set precisely so as to accurately control the space into which the resilient insert may expand in an axial direction under compression.

This second feature is extremely important because, if the cavity containing the insert is too long, the resilient material will be permitted to expand too far in the axial direction and, consequently, fail to place sufficient force on the cutting tool's shaft or shank when the sliding collar is moved to the secured position.

If, on the other hand, too little axial expansion is permitted, movement of the sliding collar to the engaged or secured position is rendered impossible, due to the resistance encountered when the insert has reached its limit of compressability.

The nut has an axial bore therethrough of approximately the same diameter as the diameter of the bore in the drive shaft for operative reception of the shaft of the cutting tool to be secured to the drive shaft. When the cutting tool shaft is disposed in the bores of the nut, insert and drive shaft, the cutting tool shaft is held in axial alignment in the bore of the nut and the bore in the drive shaft. Pressure on the cutting tool shaft through the insert by the ball or balls will not cause any misalignment of the cutting tool shaft or wobbling of the cutting tool shaft.

OBJECTS AND ADVANTAGES OF THE INVENTION

It is an object of the present invention to provide a clamping device for cutting tools such as bits, burrs and the like wherein the shafts of such cutting tools may be easily inserted into and removed from the clamping device.

Another object of the invention is to provide a clamping device of this character wherein little or no pressure on the cutting device is needed to insert it into or remove it from the clamping device.

Still another object of the invention is to provide a device of this character wherein torque or twisting movement of the cutting tool in the clamping device is practically impossible when the clamping device is engaged.

A further object of the invention is to provide a device of this character whereby clamping may be quickly and easily effected and whereby quick and easy release may also be effected.

A still further object of the invention is to provide a resilient insert whereby the effective clamping parts are not metal to metal.

Another object of the invention is to provide a device of this character wherein the resilient insert is easily removable for replacement.

Still another object of the invention is to provide a device of this character having means to adjust or vary the volume of the chamber containing the insert for the purpose of compensating for length tolerance of the insert as well as providing a means of varying the grip force applied to the insertable cutting tool.

A further object of the invention is to provide a device of this character that does not require very close tolerances.

A still further object of the invention is to provide a device of this character that is relatively inexpensive to manufacture.

Another object of the invention is to provide a device of this character that has a variety of uses such as for deburring tools, dental tools, tools for hobby use and the like.

The characteristics and advantages of the invention are further sufficiently referred to in connection with the following detailed description of the accompanyind drawings and represent certain embodiments. After considering these examples, a skilled person will understand that many variations may be made without departing from the principles disclosed and I contemplate the employment of any structures, arrangements or modes of operation that are properly within the scope of the appended claims.

BRIEF DESCRIPTION OF THE DRAWING

Referring to the drawing, which is for illustrative purposes only:

FIG. 1 is a longitudinal section through a clamping device embodying the present invention, the clamping device being shown in the release position;

FIG. 2 is a sectional view taken on line 2—2 of FIG. 1;

FIG. 3 is a longitudinal section through the clamping device showing the shaft of a cutting tool disposed therein and with the device in the clamping position; and FIG. 4 is a view similar to FIG. 3 showing an alternative arrangement.

DESCRIPTION OF THE PREFERRED EMBODIMENTS

Referring more particularly to the drawing, there is shown an end portion of a tool embodying the present invention. The tool 10 shown is merely for illustrative purposes, and could be of any size, shape or configuration. A rotatable shaft extending from the front of any tool could be modified to incorporate the principles herewith disclosed.

A shaft extends outwardly beyond the forward face of the tool 10. A shaft part 11 has an axial rotatable tool shaft bore 12 therein which is enlarged at 13 and comprises an insert housing bore and is further enlarged at 14, the enlarged part 14 being an internal thread relief. From the thread relief 14 to the shaft 11 forward termination, the shaft 11 is internally threaded 15. The tool shaft bore 12 is sufficiently deep in shaft 11 to accept the longest cutting tool shank contemplated for usage in the tool. The external configuration of the portion of shaft 11 which lies within the tool 10 is optional, requiring only that the smallest outside diameter in the area of the tool shaft bore 12 be of sufficient size to permit a reasonable wall thickness around tool shaft bore 12.

Within the enlarged part 13 of the shaft part 11 is a resilient insert 16 of any suitable material. It has been found that very satisfactory results are obtained by having the insert of rubber and the rubber may be 70 shore, although it is not limited thereto. The insert has an axial bore 17 therethrough of substantially the same diameter as the bore 12 in the shaft part 11.

A retainer nut 18 has an externally-threaded part 19 screwed into the enlarged, internally-threaded part 15 of the shaft 11. Nut 18 has an enlarged head 20 of any suitable shape. However, some portion of this head must protrude radially outwardly a distance sufficient to limit the forward travel of the collar 26. The inner end of the nut 18 has an inward extension 21 that has a diameter slightly smaller than the diameter of the enlarged bore 13 of the shaft, so that said extension 21 may enter into the bore 13. Normally, the free end of the extension 21 is just at the entrance of the bore 13 and it may be said that said free end of the part 21 is flush with the entrance of bore 13. With this arrangement, the insert is properly and securely positioned and retained in the bore 13 and, if it is desired to reduce the axial length of the bore 13 of the shaft, the nut may be screwed further into the end of the shaft 11 with the extension 21 effecting the reduction of the axial length of bore 13. When the insert is compressed by moving the collar 26 to its forward position shown in FIG. 3, its inner end is forced into the space 22 which flairs outwardly from the tool shaft bore 12 of the shaft to the insert bore 13 thereof. The nut has a bore 23 extending longitudinally therethrough of the same diameter as the bore 17 of the insert, when the latter is not under compression, and the diameter of the bore 12 of the shaft.

Shaft 11 has a plurality of radial bores 24 intermediate the ends of the insert bore 13 and connected therewith at their inner ends. In the radial bores 24 are steel balls 25. The diameter of each of the radial bores 24 is slightly greater than the diameter of the balls, and the diameter of said balls is greater than the thickness of the wall of the shaft defining the insert bore 13 so that, normally, the balls extend outwardly of the shaft portion defining the insert bore 13.

On the shaft 11 there is a collar, indicated generally at 26, of less length than the distance from the forward face of tool 10 to the nut head 20, said collar being slideable on the shaft 11. The outer end of the collar has a bore 27 of sufficient diameter to receive the balls 25, and at the inner end of said bore 27 there is an annular cam 28 which may be termed the collar cam. Cam 28 tapers inwardly and when the collar 26 is moved from its inner release position, shown in FIG. 1, to its locking position, shown in FIG. 3, the collar cam 28 engages the balls 25 and forces them inwardly in their radial bores 24, so that said balls compress those parts of the insert 16 with which they come into engagement. When the collar is moved to its outer locking position, as shown in FIG. 3, the inner end portion 29 of the collar holds the balls 25 in the locking position. Movement of the collar to its inner position will allow the balls to be forced outwardly by the resilience of the insert to the release position shown in FIG. 1.

In FIG. 3, there is shown the shaft or stem 30 of the cutting tool disposed in the bores 23, 17 and 12. The collar 26 is shown in the locking position with the balls 25 at the inner position and compressing the insert on the shaft 30. It will be noted that the inner end of the insert is forced at least part way into the space 22 when compressed.

Any suitable number of balls may be used, there being 3 shown in the arrangement of FIGS. 1, 2 and 3. The device will work with but a single ball or with two balls, although it is preferred that at least three balls be used.

In the embodiment of FIG. 4, the parts that are the same as in the arrangement shown in FIGS. 1, 2 and 3 will have the same reference numerals. The difference between the embodiment of FIG. 4 and the embodiment of FIGS. 1, 2 and 3 is in the collar which is indicated generally at 26–A in FIG. 4. This collar 26–A has an annular collar cam, indicated at 28–A, which is reversely inclined relative to the collar 26. The collar 26–A is slideable on the outer end portion of the shaft 11 and includes the part 29–A corresponding to the part 29 of the collar shown in FIGS. 1, 2 and 3.

With this arrangement, the clamp is in the release position when the collar is at its outer limit of movement, and in the clamping position when said collar is at its inner limit of movement. However, this arrangement has the addition of a suitable means, indicated at 31, to limit the collar's inner movement so as to prevent the rear face of the collar from contacting the forward face of the tool 10. FIG. 4 shows this collar stop device 31 as a separate ring pressed onto the outside diameter of shaft 11, though it could be an integral part of the shaft itself. A further possibility may be to use a snap ring to limit the rearward travel of the collar.

In FIG. 4, it is to be noted that there are four balls used and, of course, even more may be provided.

In FIG. 1, the forward face of the tool 10 limits inward movement of the collar. In FIG. 4, the collar stop part 31 accomplishes this task. The head 60 of the nut limits outward movement of said collar.

With the arrangement shown in FIGS. 1, 2 and 3, the three balls exert great forces at three pressure points on the burr shaft portion directly beneath the balls when the collar 26 is in the locking position, thereby firmly clamping the cutting burr or the like to the drive shaft assembly. When the collar is moved to the release position, the resilience of the rubber insert pushes the metal balls outwardly so that they follow the incline of the collar cam to the outer position shown in FIGS. 1, 2 and 3, thereby releasing the pressure on the cutter shaft so that the cutter may be easily removed by pulling out the shaft. The shaft may, of course, be easily and quickly inserted into the bores provided therefor, and said shaft then easily and quickly is clamped in operative position. With the four-ball arrangement of FIG. 4, there are four pressure points for clampingly securing the cutting tool shaft to the drive shaft. With either arrangement or with arrangements having a different number of balls, torque or twisting movement of the cutter shaft 30 is practically impossible when the clamp is in the clamping position.

The insert is very simple and can be easily removed and easily replaced.

The invention and its attendant advantages will be understood from the foregoing description and it will be apparent that various changes may be made in the form, construction and arrangement of the parts of the invention without departing from the spirit or scope thereof or sacrificing its material advantages, the arrangement hereinbefore described being merely by way of example, and I do not wish to be restricted to the specific form shown or uses mentioned except as defined in the accompanying claims.

I claim:

1. A clamping device for operably holding rotatable tools, comprising:
    a drive shaft adapted to have one end connected to a source of power and having its other end free, said drive shaft having a free end portion with a tool shaft bore extending axially from its free end for operable reception of the shaft of a rotatable tool, said bore having an enlarged insert housing bore adjacent the free end of said drive shaft, there being at least one radial bore extending from the surface of the shaft into the enlarged insert housing bore;
    a resilient cylindrical insert in said insert housing bore, said insert having an axial bore therethrough of substantially the same diameter as the tool shaft bore and axially aligned therewith;
    means for retaining said insert in said insert housing bore;
    a ball of hard material in said radial bore, the diameter of said ball being greater than the thickness of the wall of the drive shaft defining the circumference of the insert housing bore so that a portion of said ball extends outwardly of the outer surface of the drive shaft when in the release position; and
    a sleeve slideable longitudinally on the drive shaft, said sleeve having a bore part with an internal diameter of sufficient size to snugly receive the drive shaft but to be freely slideable thereon and with another part having a bore, the internal diameter of which is greater than the outside diameter of the drive shaft, there being a cam surface between the sleeve bores and, with the sleeve in one position, the ball is in its usual release position, sliding the sleeve to another position, causing the cam surface to engage the ball and force it inwardly to pass inwardly on a portion of the insert.

2. The invention defined by claim 1, wherein there is a bore through the means for retaining the insert in the insert bore, the bore through said means being substantially the same diameter as the tool shaft bore.

3. The invention defined by claim 2, wherein the means for retaining the insert in its housing bore comprises a nut threadably connected to the drive shaft, and the bore through said nut is axially aligned with the bore in the insert and the bore in the drive shaft, into which bores the cutting tool is adapted to be inserted.

4. The invention defined by claim 2, wherein there are a plurality of radial bores annularly and equally spaced apart and a plurality of balls operably disposed in the respective radial bores.

5. The invention defined by claim 3, wherein the inner end of the nut has a part for retaining the insert in position and for adjustably varying the length of the cavity in which the resilient insert reposes.

6. The invention defined by claim 4, including stop means for limiting longitudinal movements of the sleeve whereby, when the sleeve is at one limit of movement, the balls are in the larger diameter part of the sleeve and, when said sleeve is at the opposite limit of movement, the balls are held entirely within the radial bores to effect clamping of a rotatable tool shaft in the axially-aligned bores.

7. The invention defined by claim 6, wherein there is an outwardly-flared space from the tool shaft bore to the insert-housing bore.

8. The invention defined by claim 6, wherein the cam in the sleeve is inclined outwardly.

9. The invention defined by claim 6, wherein the sleeve cam is inclined inwardly.

10. The invention defined by claim 9, including an annular stop on the drive shaft adjacent the inner end of the sleeve for engagement by the sleeve when moved to its inward clamping position.

11. The invention defined by claim 3, wherein there are a plurality of radial bores into the insert-housing bore, said radial bores being equally spaced apart; a spherical ball in each of said radial bores, a part of said nut at its inner end retaining the insert and adapted to enter the inserthousing bore to control and limit said insert's axial expansion under compression; and stop means limiting sliding movement of the sleeve in either direction, the balls being disposed in the larger diameter part of said sleeve when said sleeve is in the release position at one limit of movement, said balls being forced inwardly within their respective radial bores when the sleeve is moved to the opposite, secured-limit position, there being an outwardly-flaring space between the tool shaft bore and the insert-housing bore.

12. A clamping device for operably holding rotatable tools, comprising:

a drive shaft adapted to have one end connected to a source of power and having its other end free, said drive shaft having a free end portion with a tool shaft bore extending axially from its free end for operable reception of the shaft of a rotatable tool, said bore having an enlarged, insert-housing bore adjacent the free end of said drive shaft, there being a plurality of radial bores intersecting the enlarged, insert-housing bore approximately at its longitudinal center;

means for retaining the insert in said insert-housing bore, said means having an axial bore therethrough of substantially the same diameter as the tool-shaft bore;

a resilient, cylindrical insert of rubber in said insert-housing bore, said insert having an axial bore therethrough aligned with the tool-shaft bore and the bore through the means for retaining the insert in its bore;

balls in the respective radial bores, said balls extending outwardly of the drive shaft when in a release position; and means for forcing said balls inwardly for exerting pressure on said insert to compress same against a rotatable tool shaft disposed in said insert bore.

* * * * *